United States Patent [19]

Eggen

[11] 4,343,818

[45] Aug. 10, 1982

[54] COCOA PRODUCT AND PROCESS OF PREPARATION

[75] Inventor: Ingmar B. Eggen, New Milford, Conn.

[73] Assignee: Societe d'Assistance Technique pour Produits Nestle S.A., Lausanne, Switzerland

[21] Appl. No.: 142,123

[22] Filed: Apr. 21, 1980

Related U.S. Application Data

[63] Continuation of Ser. No. 933,967, Aug. 15, 1978, abandoned.

[51] Int. Cl.$^3$ .............................................. A23G 1/02
[52] U.S. Cl. ...................................... 426/45; 426/52; 426/459; 426/469; 426/489; 426/507; 426/593; 426/631; 426/650; 426/655
[58] Field of Search ................... 426/45, 52, 270, 331, 426/593, 631, 650, 655, 459, 464, 472, 489, 495, 469, 478, 482, 507

[56] References Cited

U.S. PATENT DOCUMENTS

| | | | |
|---|---|---|---|
| 571,238 | 11/1896 | Pieper | 426/45 |
| 1,854,355 | 4/1932 | Wallerstein | 426/45 |
| 2,014,342 | 9/1935 | Gutekunst | 426/45 |
| 2,380,158 | 7/1945 | Durrenmatt et al. | 426/631 X |
| 2,899,309 | 8/1959 | Rusoff | 426/631 |
| 2,965,490 | 12/1960 | Rusoff | 426/45 |
| 3,392,027 | 7/1968 | Hess | 426/45 |
| 3,397,061 | 8/1968 | Katz | 426/45 |
| 3,821,420 | 6/1974 | Arden | 426/593 X |
| 3,982,042 | 9/1976 | Arden | 426/631 |
| 3,997,680 | 12/1976 | Chalin | 426/631 X |

FOREIGN PATENT DOCUMENTS 49-33137  4/1974  Japan ..................................... 426/45

OTHER PUBLICATIONS

Hawley, *The Condensed Chemical Dictionary,* 9th Ed., 1977, p. 268.

*Primary Examiner*—Arthur L. Corbin
*Attorney, Agent, or Firm*—Vogt & O'Donnell

[57] ABSTRACT

A cocoa product is prepared by enzymatically hydrolyzing an aqueous slurry of low fat cocoa with an amylase-containing enzyme, adding alkali to the hydrolyzed slurry and heating the alkali containing slurry.

12 Claims, No Drawings

COCOA PRODUCT AND PROCESS OF PREPARATION

This is a continuation of application Ser. No. 933,967, filed Aug. 15, 1978, now abandoned.

This invention relates to edible products obtained from cocoa especially suitable for use as colouring and flavouring agents.

Conventional cocoa powder is prepared from roasted cocoa beans by removing the husks or shells and grinding the roasted beans to a semi-liquid sludge known as cocoa liquor. The fat (cocoa butter) is then separated from the cocoa liquor, generally by pressing, and the partially defatted cocoa solids are finely ground to give the product known as cocoa, or cocoa powder. The cocoa powder may then be subjected for a further treatment known as "dutching", in which it is contacted with an alkali, usually potassium carbonate, in the presence of water.

The main purpose of dutching is to render the cocoa more easily dispersible in water. The chemical reactions which occur during dutching are complex but it is believed that a limited hydrolysis takes place, producing compounds which render the cocoa less hydrophobic.

The traditional dutching process gives a product which disperses in warm water or milk more or less readily but which is still far from being completely soluble. Thus, on dispersion in water, an emulsion is produced rather than a solution and the emulsion is opaque with a deep brown colour and characteristic heavy taste. These characteristics make conventional cocoa unsuitable for colouring and flavouring foods requiring a light appearance and texture, such as certain types of decorative creams and icings, or for soft drinks in which complete water-solubility is practically essential.

It is therefore an object of the invention to provide a cocoa product which possesses a desirable dark colour.

Other objects of the invention will become apparent from the following description.

According to the invention, a process for making a cocoa product comprises mixing low fat cocoa with water to form a cocoa slurry, enzymatically hydrolysing the slurry and subsequently heating the slurry with an alkali.

The term "low fat cocoa" is well known in the chocolate industry, meaning a cocoa containing less than about 12% of fat, and it is used herein in this sense.

The low fat cocoa used as starting material for the process according to the invention is produced in accordance with traditional methods. Raw cocoa beans are first roasted, the roasted beans are cooled and the shells are removed. The deshelled beans, known as nibs, are then ground and during grinding the temperature of the nibs rises sufficiently to melt the fat giving a brown viscous sludge known as cocoa liquor.

Following conventional practice, the cocoa liquor is then pressed or otherwise processed to remove much of the cocoa fat (cocoa butter), whereby the fat content is reduced from about 50% to less than about 12% for a low fat cocoa, and a "cake" of low fat cocoa is produced. The cake is then ground to a relatively fine powder, e.g. 120 mesh.

According to the present invention, this powder is first mixed with water, e.g. from 2 to 3 parts by weight water for 1 part low fat cocoa and heated, e.g. to 75° to 90° C. to give a hydrated cocoa slurry.

An amylase-containing enzyme preparation is then added to the hydrated to bring about hydrolysis of the carbohydrate constituents in the cocoa. The optimum conditions for hydrolysis depend on the enzyme used. For a typical enzyme (Rhozyme H-39 at a concentration of $16 \times 10^{-4}$ parts by weight per 1 part cocoa) a temperature of 77° C. for a time of 15 minutes is sufficient. The slurry becomes substantially completely liquid as the high molecular weight carbohydrate constituents are degraded to compounds of lower molecular weight.

After hydrolysis and addition of other constituents, such as sucrose, if required, the liquefied slurry is "dutched", e.g. treated with an alkali such as sodium hydroxide. This is best carried out in a stirred vessel with a copious supply of air. During stirring the slurry with added alkali is heated, e.g. to 88° to 93° C. and water must generally be added to replace that lost by evaporation. The alkali may be added in a single charge initially or if more vigorous dutching is required it may be added in successive charges as the alkali is consumed. The slurry is advantageously dutched in a jacketed vessel which is heated by steam injection.

As the cocoa has been liquefied by hydrolysis, more efficient mixing with the alkali, the sugar if added, is obtained than with unhydrolysed cocoa. Contact with the air is also greatly improved by the hydrolysis and this gives improved colour development.

During prolonged dutching the colour of the cocoa changes gradually, first to a deep red and eventually to black. The "chocolatey" flavour is progressively reduced in intensity during the process and a product is finally obtained which is readily water-soluble with little insoluble residue.

After dutching the resulting liquid may be used directly as a flavouring or colouring, for example in ice cream or in fondants. However, if it is centrifuged to remove residual solids a clear syrup is produced which is readily dispersed in water and is especially useful for making cocoa-flavoured milk or soft drinks. When it is mixed with carbonated water, for example, a very tasteful beverage is produced having a clear, sparkling appearance. Further flavouring and colouring agents, preservatives, dietetic supplements and other additives may also be added.

If the product is to be stored before use, it is usually advantageous to dry the syrup to a solid powder. This may be done by any established drying technique, such as double drum drying or spray-drying. The dried solid is ground and sifted to the required grain size e.g. 170 mesh. On stirring in an aqueous medium the powder readily dissolves. Alternatively, the powder may be dissolved in an organic carrier, e.g. propylene glycol, which is dispersed in the mixture to be flavoured.

In order that the invention may more easily be understood, preferred embodiments are described in the following Examples, given by way of illustration only. All parts and percentages are by weight.

EXAMPLE 1

One part by weight of cocoa containing 10 to 12% fat and ground to 120 mesh is mixed with three parts water and the mixture is heated to 88° C. for 15 minutes with stirring to produce a hydrated cocoa slurry. This slurry is cooled to 49° C. and 0.001 parts of the enzyme "Clarase", having amylase activity, is added. The slurry is then held at 49° C. for 45 minutes during which time the high molecular weight compounds in the cocoa are hydrolysed. After hydrolysis the temperature is raised to 71° C. and 0.25 parts of sugar are stirred into the slurry.

0.048 parts of 50% sodium hydroxide solution and 2.0 parts water are added and the mixture is heated to 93° C. and stirred in an open vessel with a copious supply of air. After one hour and again after two hours at 93° C. another charge of 0.048 parts of 50% sodium hydroxide solution and 2 parts water is added. Stirring is continued for a total of five hours at 93° C. to yield a fully dutched product.

To make a cocoa-flavouring beverage, the dutched slurry is centrifuged in a conventional centrifuge to remove coarse particles and the centrifuged slurry is made into a syrup according to the following recipe:

| | |
|---|---|
| Slurry (16.6% solids) | 1.97 parts |
| Water | 1.71 |
| Sucrose | 7.27 |
| Liquid invert sugar | 3.35 |

This syrup may then be diluted with carbonated water to give a soft drink. A suitable dilution is 14.3% syrup, 85.7% carbonated water.

If the cocoa is required as a solid, the dutched slurry may be dried on a suitable double drum atmospheric dryer of conventional type (steam pressure 7.3 kg/cm$^2$; drum spacing 0.013 cms) until a solid is obtained and the solid is ground in a micropulveriser and sifted to 170 mesh. On being dispersed in milk this material gives a pleasant deep, red/brown coloured beverage.

To prepare a colouring agent for decorative icings, a mixture may be prepared having the following composition:

| | |
|---|---|
| Dried dutched cocoa slurry | 22.8% by weight |
| Propylene glycol | 68.2% |
| Lecithin | 9.0% |

This colouring material may be incorporated at a concentration of about 5 to 15% in a wide variety of decorative icings, of which the following approximate composition is typical:

| | |
|---|---|
| Skim milk solids | 20.5% |
| Fat | 35.5% |
| Sugar | 43.0% |
| Water | 0.7% |
| Flavourings | 0.3% |

The resulting icing has a deep red colour.

EXAMPLE 2

One part by weight of cocoa containing 10 to 12% fat and ground to 120 mesh is mixed with two parts water at 55° C. and heated to 77° C. until a uniform hydrated cocoa slurry is produced. 0.0005 parts by weight of the enzyme "Rhozyme "H-39", having amylase activity is added and the slurry is heated at 77° C. for 15 minutes. 0.068 parts of 50% sodium hydroxide solution are added and the mixture is heated by steam injection in a jacketed vessel for five hours at 88° C. A copious supply of air is also fed to the mixture and water is added as necessary to replace vapour losses.

After dutching the liquid slurry is dried in an atmospheric double drum drier at a steam pressure of 7.3 kg/cm$^2$ and 0.01 cm drum spacing. The dried cocoa is then ground in a micropulveriser and sifted to a 170 mesh particle size.

To make a cocoa-flavoured milk drink, this dried cocoa is dispersed in milk, giving a pleasant dark red colour.

I claim:
1. A process for making a cocoa product which consists essentially of:
   (a) mixing a low fat cocoa, obtained from roasted cocoa beans, with water to form a cocoa slurry;
   (b) enzymatically hydrolysing the cocoa slurry with an amylase-containing enzyme;
   (c) adding alkali to the resulting hydrolysed slurry; and
   (d) heating the alkali containing slurry.
2. A process according to claim 1, in which the alkali is added to the slurry in successive charges.
3. A process according to claim 1, in which sugar is added to the slurry after hydrolysis and before addition of alkali.
4. A process according to claim 1, in which the hydrolysed slurry is mixed with about 0.25 parts by weight of sugar per 1 part cocoa before addition of alkali, the mixture is agitated for about five hours at about 93° C. and successive charges of about 0.024 parts by weight of sodium hydroxide, per 1 part cocoa, with about 2 parts water are added at the start of the agitation and at intervals of about 1 and 2 hours after the start of the agitation.
5. A process according to claim 1, wherein, after the slurry has been enzymatically hydrolysed and heated, the slurry is subsequently centrifuged to produce a clear extract.
6. A process according to claim 5, in which the clear extract is dried to a powder.
7. A cocoa extract prepared by the process according to claim 5.
8. A foodstuff containing an extract according to claim 7 as a flavouring.
9. A cocoa product made by the process according to claim 1.
10. A process for making a chocolate product which consists essentially of:
    (a) heating a mixture of a low fat cocoa, obtained from roasted cocoa beans, and water to form a hydrated slurry;
    (b) enzymatically hydrolysing the slurry by adding an amylase-containing enzyme preparation thereto;
    (c) adding to the hydrolysed slurry about 0.034 parts by weight of sodium hydroxide per part by weight of cocoa; and
    (d) heating the sodium hydroxide containing slurry for about five hours at 88° C.
11. A process for making a cocoa product which consists essentially of:
    (a) roasting raw cocoa beans;
    (b) deshelling the roasted cocoa beans;
    (c) grinding the deshelled, roasted cocoa beans to form a cocoa liquor;
    (d) removing cocoa fat from the cocoa liquor to form a low-fat cocoa;
    (e) mixing the low-fat cocoa with water to form a cocoa slurry;
    (f) enzymatically hydrolysing the cocoa slurry with an amylase-containing enzyme;
    (g) adding alkali to the resulting hydrolysed slurry; and

(h) heating the alkali containing slurry.

12. A process for making a chocolate product which consists essentially of:
    (a) roasting raw cocoa beans;
    (b) deshelling the roasted cocoa beans;
    (c) grinding the deshelled, roasted cocoa beans to form a cocoa liquor;
    (d) removing cocoa fat from the cocoa liquor to form a low-fat cocoa;
    (e) heating a mixture of the low-fat cocoa and water to form a hydrated slurry;
    (f) enzymatically hydrolysing the slurry by adding an amylase-containing enzyme preparation thereto;
    (g) adding to the hydrolysed slurry about 0.034 parts by weight of sodium hydroxide per part by weight of cocoa; and
    (h) heating the sodium hydroxide containing slurry for about five hours at 88° C.

* * * * *

UNITED STATES PATENT AND TRADEMARK OFFICE
CERTIFICATE OF CORRECTION

PATENT NO. : 4,343,818
DATED : August 10, 1982
INVENTOR(S) : Ingmar B. Eggen

It is certified that error appears in the above—identified patent and that said Letters Patent is hereby corrected as shown below:

In the Title Page, under the subheading "FOREIGN PATENT DOCUMENTS", "49-33137" should read --50-33137--.

At Column 2, line 2, "hydrated to bring" should read --hydrated slurry to bring--.

Signed and Sealed this

Fifth Day of October 1982

[SEAL]

Attest:

Attesting Officer

GERALD J. MOSSINGHOFF
Commissioner of Patents and Trademarks